(No Model.) 2 Sheets—Sheet 2.
H. G. STONE.
HARROW TOOTH.
No. 263,297. Patented Aug. 22, 1882.
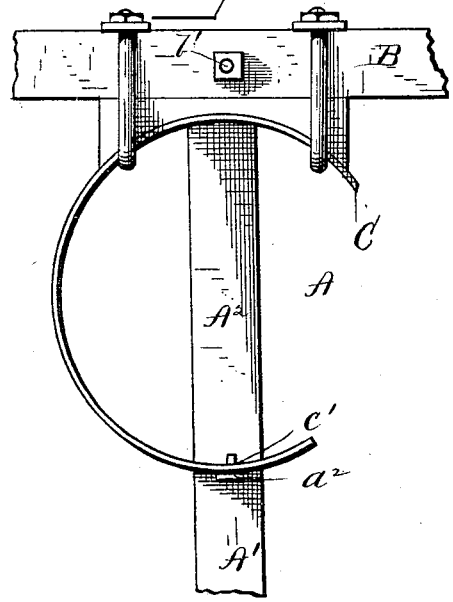
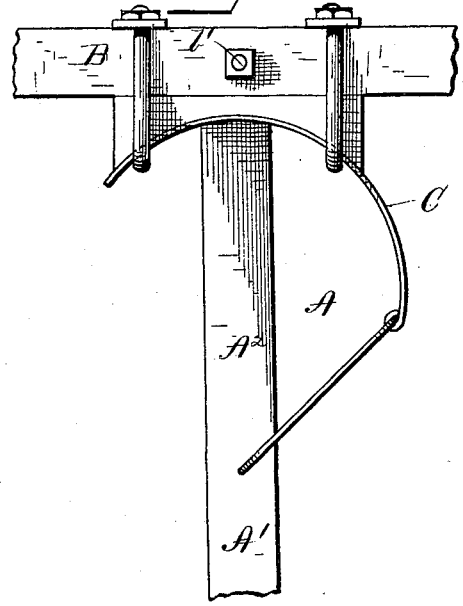
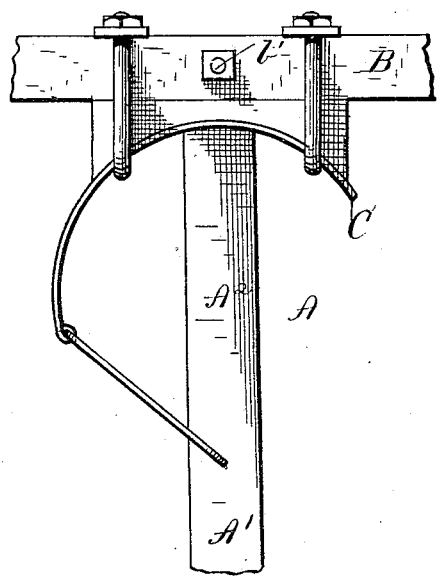
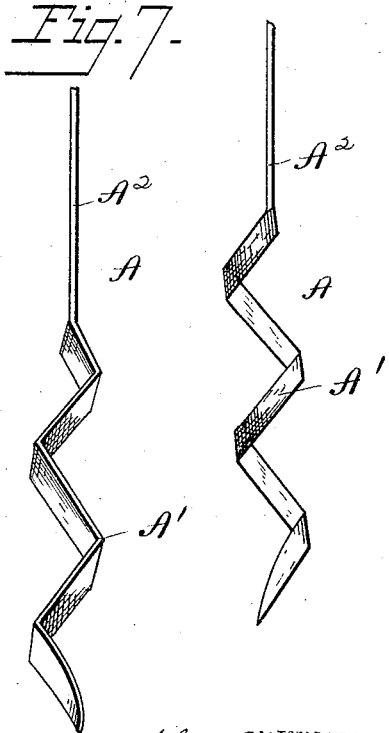
WITNESSES
INVENTOR
Horace G. Stone
by his attorney

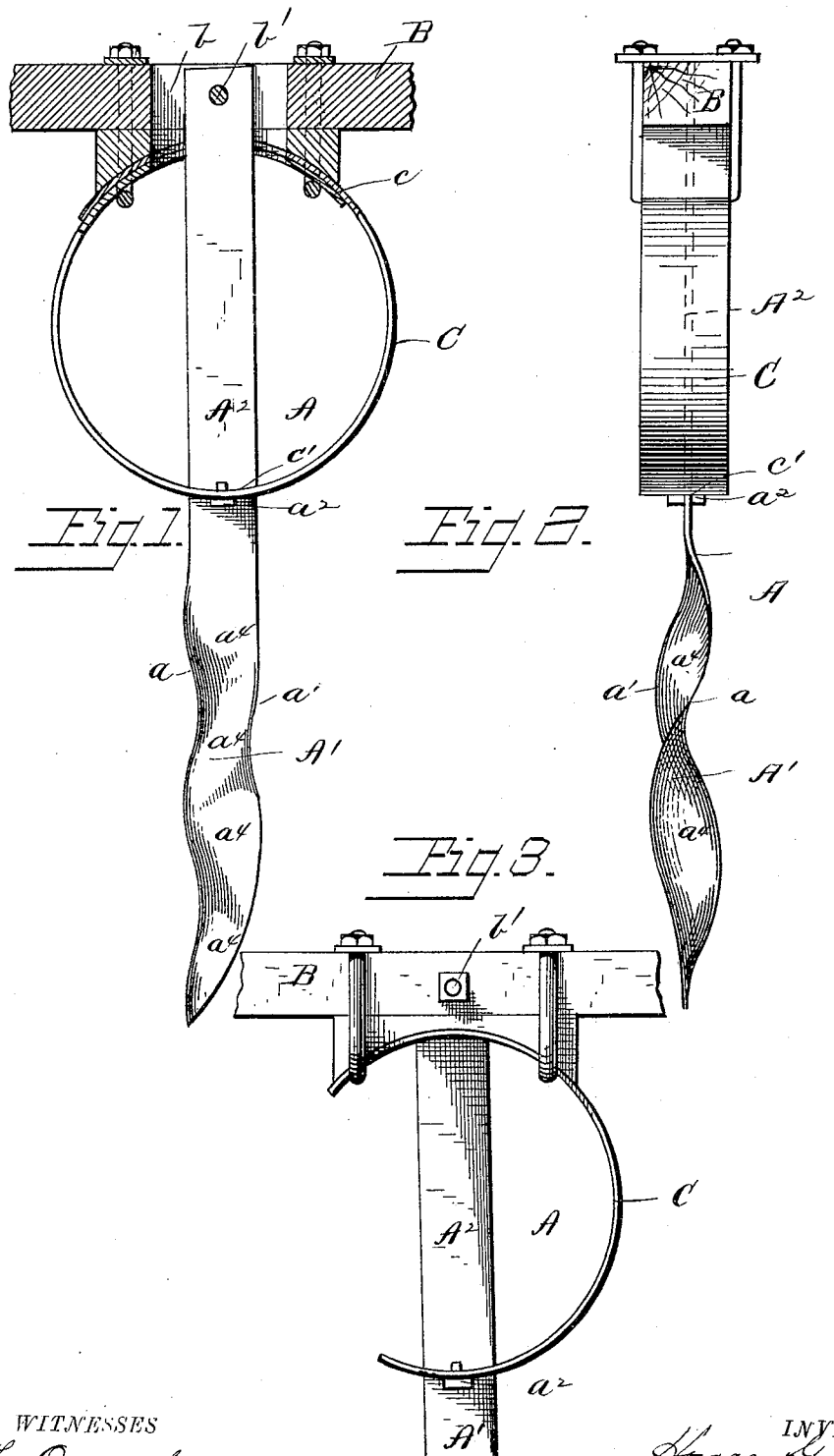

UNITED STATES PATENT OFFICE.

HORACE G. STONE, OF GRAND FORKS, DAKOTA TERRITORY.

HARROW-TOOTH.

SPECIFICATION forming part of Letters Patent No. 263,297, dated August 22, 1882.

Application filed March 30, 1882. (No model.)

*To all whom it may concern:*

Be it known that I, HORACE G. STONE, a citizen of Dakota Territory, United States, residing at Grand Forks, in the county of Grand Forks and Territory of Dakota, have invented certain new and useful Improvements in Harrow-Teeth; and I do hereby declare the following to be a full, clear, and exact description of the invention, such as will enable others skilled in the art to which it appertains to make and use the same.

This invention relates to that class of teeth for harrows, cultivators, and the like which form or are attached to or combined with a spring which adapts them to yield on meeting an obstruction and gives them an oscillating or vibrating motion to more effectually loosen and mellow the earth.

Of teeth of this class, those constructed of or forming a spring and presenting a flat or broad surface to the line of travel have been found objectionable, as they leave behind them a furrow, and they do not fulfill the requirements in working sod-ground, as the point of the tooth, traveling in advance of its shank, passes under the sod and loosens it, so that the shank will simply throw the sod aside and not break or cut it up. Those in which the tooth proper is secured at different points to or by the respective ends of a spirally-shaped spring have been found objectionable, as the strain or draft upon the tooth throws its point toward the rear, and the upper end of the tooth, acting as a lever, draws the ends of the spring together, causing them to bind, so that the tooth trails behind over the surface of the ground, or practically so. Those in which the spring-tooth has been so twisted as to present a cutting-edge to the line of travel are objectionable in working old ground, as they merely cut or slice the soil and do not turn or stir it, except perhaps at the surface, where the twisted portion of the tooth presents a broad or flat surface diagonal to the line of travel.

The object of my invention is to so construct the teeth of harrows, cultivators, and other similar implements and secure them to said implements as to avoid the objectionable features heretofore found to exist, and adapt them for the working of both old and new or sod ground.

To this end my invention consists in so constructing a tooth for harrows and the like that the blade thereof shall be provided on either side with surfaces assimilating in their form and operation the mold-board of a plow.

It further consists in securing such harrow-teeth pivotally to their beams and yieldingly supporting said teeth in the proper position with relation to the beam by means of curved springs, which are attached to both the teeth and the beam.

It further consists in certain combinations resulting from particular arrangements of the above-recited parts.

In order that my invention may be fully understood by those skilled in the art to which it appertains, I have illustrated my improvements in the annexed drawings, and will now proceed to describe the construction and operation thereof.

In said drawings, Figure 1 represents in side elevation a harrow-tooth and its spring, the tooth-beam being shown in section. Fig. 2 is a view in elevation, looking toward the front or cutting edge of the tooth. Figs. 3 to 6 illustrate modifications of the spring. Fig. 7 represents a modification of the tooth.

The same letters of reference are used in all the figures to designate identical parts.

For the sake of perspicuity I will describe my improvements in the ensuing specification as applied to harrows. It will be understood, however, that I do not limit myself to this particular application of my said improvements, it being obvious that they may be employed with advantage and without material change in many other implements used in agricultural pursuits.

Referring to the drawings, A is the harrow-tooth, which is pivoted in a slot, $b$, of the tooth-beam B by means of a bolt, $b'$. The slot $b$ is of such a length with relation to the breadth of the tooth as to permit of the oscillation thereof in the direction of its breadth.

The cutting and rear edges of the working portion or blade A′ of the tooth (which working portion or blade A′ comprises about one-half, more or less, of the entire length of the tooth) are bent to form opposing sinuous lines—that is to say, a right curve of the cutting-edge $a$ of the blade is opposite or opposed to a left curve of the rear edge, $a'$, thereof, so that the blade midway between the edges $a\ a'$ is straight, or nearly so.

On the sides of the tooth A, and about midway of its length, are formed lugs $a^2$ and the shank $A^2$ of the tooth, or that portion above the lugs $a^2$ is straight, as shown. Secured to the under side of the tooth-beam B is a stout spring, C. This spring I prefer to make of the circular form shown in Fig. 1, providing longitudinal slots $c$ in its respective overlapping ends for the reception of the upper end of the tooth A. This spring C may be secured to the tooth-beam B by means of bolts or clips, or in any other preferred manner, it only being essential that it be rigidly fixed to said beam. The spring is provided at its center with a slot, $c'$, so formed as to engage the lugs $a^2$ of the tooth, whereby the spring and tooth are locked together, the spring pressing down on the shoulders of said lugs $a^2$, as shown, and holding the tooth in the desired position with relation to the beam B. These lugs, instead of being formed as shown in Figs. 1 and 2, might be made wedge-shaped; or the lugs might be omitted and the tooth be provided with a longitudinal series of perforations, in any one of which a pin might be inserted for the spring to rest against. By this latter arrangement provision would be made for adjustments of the spring by which it might exert a greater or less pressure upon the tooth in the direction of its length.

It will be seen that by this arrangement the tooth, when at work, will be given an oscillating or vibratory motion in the direction of the line of travel, the spring exerting both a pulling and pushing pressure thereon in said direction, and that on meeting an obstruction the spring will yield sufficiently to permit the tooth to escape the obstruction without raising the harrow-frame, when the tooth will again and at once be forced down to its work.

By the peculiar form of the working portion or blade $A'$ of this harrow-tooth I provide a broad mold-board-like surface or surfaces, $a^4$, on each side of said blade, which surfaces are presented diagonally to the line of travel of the tooth, in a manner similar to the mold-board of a plow. This arrangement would be of manifest advantage as applied to a harrow-tooth having no springing action, as the mold-board surfaces would loosen and turn the soil more effectually, tending at the same time to throw the sub-soil up to the surface; but as applied to a harrow-tooth connected to its frame in the manner heretofore described, said tooth will be given a sidewise vibration on the surfaces $a^4$ on either side thereof coming in contact with slight inequalities in the soil, in consequence of the torsional action of the spring. Thus it will be seen that my improved harrow-tooth will be yieldingly supported both in the direction of its line of travel and transversely thereof, whereby the soil is stirred and loosened most effectually. An incidental advantage obtained from the sidewise yielding of the tooth is that on its meeting a slight obstruction it will be shunted around one edge thereof and not be caused to ride over it.

The front or cutting and rear edges, $a\ a'$, of the blade $A'$, instead of being bent in opposing sinuous lines, as heretofore stated, may be bent in zigzag or angular lines, as shown in Fig. 7, forming one or more V-shaped depressions on each side of said blade. The angular lines at the respective edges of the blade should be so arranged with relation to each other that the lower or mold-board sides of the V-shaped depressions shall have an upward tendency from front to rear, as this directs the soil cut by the lower portion or point of the blade upward toward the surface of the ground.

I have illustrated in the drawings certain modifications of my spring, which modifications exhibit a C-shaped spring, so applied as to exert either a pushing or pulling pressure on the tooth. I prefer, however, to use the circular or oval form of spring, as this gives both a pulling and pushing pressure on the tooth, and the torsional action of the spring in controlling the sidewise movements of the tooth is more decided.

The spring should in practice hold the tooth at such an inclination that the point will be a little in advance of its shank. Should the tooth be held at an opposite inclination, in consequence of the distortion of the spring from constant and hard usage, the defect may be easily remedied by reversing the position of the spring.

It will be evident that as the tooth advances edgewise through the soil, it will be constantly scoured and kept bright thereby.

Having thus described my invention, what I claim is—

1. A tooth for harrows and other similar implements composed, substantially as before set forth, of a straight shank, $A^2$, and a blade, $A'$, the front and rear edges of which are bent to form oppositely-arranged series of curves or angles.

2. The combination, substantially as before set forth, of the beam, the spring, and the tooth, the latter provided at its front and rear edges with opposing sinuous curves, and having the straight shank pivoted to the beam and spring.

3. The combination, substantially as before set forth, of the beam having a slot, the circular spring secured at its ends to said beam, and slotted longitudinally at its center, and the tooth pivoted at its end in the slot of the beam, and having a bearing about midway of its length in the slot of the spring.

In testimony whereof I affix my signature in presence of two witnesses.

HORACE G. STONE.

Witnesses:
SCHUYLER R. BARNETT,
WILLIAM BUDGE.